Patented Aug. 11, 1942

2,292,442

UNITED STATES PATENT OFFICE 2,292,442

POLYMERIC COMPOSITION

William E. Hanford, Wilmington, Del., assignor to E. I. du Pont de Nemours & Company, Wilmington, Del., a corporation of Delaware No Drawing. Application December 18, 1939, Serial No. 309,900

10 Claims. (Cl. 260—43)

This invention relates to compositions of matter and more particularly to compositions comprising mixtures of polymeric materials.

This invention has as its object the preparation of new and useful compositions of matter. A further object is to prepare modified polyamides of improved properties. A still further object is to form products useful in the plastic, molding, coating, impregnating, sizing, and related arts. Other objects will appear hereinafter.

These objects are accomplished by the production of a composition of new and valuable properties which comprises a homogeneous mixture of synthetic polyamide and phenol-formaldehyde resin. The methods for carrying out my invention involve the intimate mixing of low molecular weight or non-fiber-forming synthetic polyamide with a phenol which is non-reactive toward the polyamide or toward the reactants which form it, treating this mixture with formaldehyde or a formaldehyde-liberating substance, and heating the mixture to continue the polymerization of the polyamide and to effect the formation of phenol-formaldehyde resin.

In the preferred practice of my invention the polyamide-forming reactants are first heated in a closed system in the presence of a formaldehyde-reactive phenol free from amide-forming groups until a low molecular weight polyamide (intrinsic viscosity less than about 0.45) is obtained. Formaldehyde or a formaldehyde-liberating material is then added and the mixture is heated until the phenol and formaldehyde react to resinification and until further polymerization of the polyamide constituent occurs. The two reactions, namely, formation of phenol-formaldehyde resin and further polymerization of the polyamide, usually occur simultaneously. The reaction is preferably continued until the polyamide has an intrinsic viscosity above 0.5. If the amount of phenol-formaldehyde is not too great, the product will exhibit definite fiber-forming characteristics.

The formation of a low molecular weight polyamide, which may be determined by its intrinsic viscosity, as indicated above, can be assured by preventing the escape of the by-product of the reaction, if it is water or alcohol, or by carrying out the reaction in the presence of water, alcohol, or the like. The heating schedules used will vary somewhat depending upon the particular reactants. The first step of forming the low molecular weight polymer is in most instances conducted at a temperature of 180° to 290° C. for 1 to 5 hours, and the reaction of the polyamide-phenol mixture with formaldehyde is usually at temperatures of 180° to 225° C. for from 2 to 15 hours.

The above procedure may be varied by mixing the separately prepared low molecular weight polyamide with the phenol rather than by reacting the polyamide-forming reactants in the presence of the phenol. When the separately prepared polyamide is used, care must be taken before addition of the formaldehyde to obtain thorough mixing of the polymer and phenol. The preferred method described above, insures complete mixing.

The phenolic substance may be a non-heat hardenable one such as o-cresol or p-cresol, or other phenols having at least one but not more than two substitutable positions ortho or para to the phenolic hydroxyl group or groups. When such phenolic materials are used, it is easier to carry out the second step of the reaction without the phenol-formaldehyde constituent becoming infusible before the further polymerization of polyamide is effected. If the phenolic substance used is one which gives a heat-hardenable phenol-formaldehyde resin, then the amount of formaldehyde or formaldehyde-liberating material used in the second step of the preparation must be insufficient to cause gelation. Since the important part of the second step in the preparation of the products of this invention is the completion of the amidation reaction, the temperature for the second step is usually in excess of 150° C. and preferably in the neighborhood of 180° to 225° C.

The present invention is applicable to polyamides of either the diamine-dibasic acid type or to those of the amino acid type which include the polymers obtained from the lactams and other amide-forming derivatives of the polymerizable amino acids. The preferred type of polyamides, those of the diamine-dibasic acid type, are conveniently made from the salt of this type of reactants.

The following examples, in which parts are by weight, illustrate the preparation and application of the products of this invention.

*Example I*

A mixture of 112 parts of hexamethylene diammonium adipate, 167 parts of decamethylene diammonium sebacate, and 23.5 parts of phenol was heated in an evacuated vessel from which the oxygen has been very carefully removed by flushing with deoxidized nitrogen. This vessel was heated in a bath at 250° C. for two hours.

It was then opened and the resultant friable mixture of low molecular weight polymer and phenol was ground to a fine powder and 6 parts of hexamethylenetetramine added. The mixture was then thoroughly mixed and ground together, after which it was heated at 180° C. for two hours under an atmosphere of deoxidized nitrogen, followed by heating for a half hour at 180° C. in a vacuum of 2 mm. of mercury. The resulting polyamide contained about 10% of a phenol-formaldehyde resin. It was hard and somewhat brittle, but could be formed into fibers. It was red-brown in color, soluble in butanol and insoluble in acetone, and melted at about 195° C. This material may be drawn into fibers or sheets exhibiting molecular orientation upon X-ray examination. It may also be molded to films or other desired shapes.

*Example II*

An intimate mixture of 50 parts of hexamethylene di-ammonium adipate, 75 parts of decamethylene diammonium sebacate, and 94 parts of phenol was prepared. This mixture was heated in a vessel, from which the oxygen had been very carefully removed by flushing with deoxidized nitrogen, to a temperature of 250° C. for two hours. The product, a low molecular weight polyamide containing phenol, was then removed, mixed with 5 parts of hexamethylene-tetramine and 45 parts of paraformaldehyde, and heated at 180° C. for three hours under an atmosphere of nitrogen. The product was hard, transparent, yellow, and somewhat brittle. This material was molded to an insoluble infusible chip at 180° C. and 6000 lbs./sq. in. pressure.

*Example III*

An intimate mixture of 79 parts of hexamethylene diammonium adipate, 118 parts of decamethylene diammonium sebacate, and 54 parts of o-cresol was prepared and heated at 230°–250° C. for three hours in an evacuated vessel from which the oxygen had been carefully removed by flushing with deoxidized nitrogen. The resulting mixture of low molecular weight polyamide and o-cresol was intimately mixed with 12 parts of finely divided hexamethylene-tetramine and heated at 180° C. for six hours in an atmosphere of deoxidized nitrogen, followed by heating at 180° C. for an hour under reduced pressure (2 mm. of mercury). The product was a hard, fairly tough solid of orange-red color; it was soluble in alcohol and had a softening range of 90°–100° C. This product could be readily molded to desired shapes or could be cut and machined on a lathe.

*Example IV*

A mixture of 70 parts of decamethylene diammonium sebacate, 47 parts of hexamethylene diammonium adipate, and 33 parts of p-tertiary amyl phenol was heated at 250° C. for three hours in an evacuated vessel from which the oxygen had been carefully removed by flushing with deoxidized nitrogen. The resulting mixture containing low molecular weight polymer was intimately mixed with 5 parts of hexamethylenetetramine and heated at 180° C. for five hours under an atmosphere of nitrogen. The product was a translucent, hard, and somewhat rubbery brownish-yellow solid which was soluble in alcohol and insoluble in benzene. The material had a softening range of 160°–163° C.

*Example V*

An intimate mixture of 45 parts of decamethylene diammonium sebacate, 30 parts of hexamethylene diammonium adipate, and 61 parts of 4-hydroxy-1,2-dimethyl benzene was heated at 250° C. for three hours in an evacuated vessel from which the oxygen had been carefully removed by flushing with deoxidized nitrogen. The resulting mixture containing low molecular weight polyamide was treated with 12 parts of hexamethylenetetramine and heated at 180° C. for four hours under an atmosphere of deoxidized nitrogen. The product was a hard, brittle, transparent orange solid which had a softening range of 125°–130° C.

*Example VI*

An intimate mixture of 11 parts of hexamethylene diammonium adipate and 3 parts of p-tertiary butyl phenol was heated at 250° C. for three hours in an evacuated vessel from which the oxygen had been carefully removed by flushing with deoxidized nitrogen. The resulting mixture of low molecular weight polymer and the phenol was then treated with 0.5 part of hexamethylenetetramine and heated at 256° C. for five hours under a stream of deoxidized nitrogen, followed by heating at 282° C. for two hours under a stream of nitrogen. The product was a hard, brittle, light brown solid softening at 250°–260° C. The product absorbed 2.0% and 6.5% moisture at 50% and 100% relative humidity, respectively, as compared with 2.6% and 7.6% for polyamide prepared from hexamethylene diammonium adipate alone.

Polyamide-forming reactants useful in the manufacture of fiber-forming polyamides, as disclosed in Patents 2,071,250, 2,071,253, and 2,130,948, may be used in the practice of this invention. Thus the low molecular weight polymers used in the present process may be obtained from a diamine and a dibasic carboxylic acid or amide-forming derivative thereof or from a polymerizable amino carboxylic acid or amide-forming derivative thereof, e. g. their lactams, anhydrides, or esters. The mention of diamine, dibasic acid and aminocarboxylic acid herein is therefore intended to include also the amide-forming derivatives of these reactants. These reactants, whether they comprise two or more compounds, or a single compound such as an amino acid, are all referred to herein as polyamide-forming reactants or compositions.

The phenolic substitutents are not limited to the examples given but may also include other phenolic materials such as alkyl or aryl substituted phenols. The only restriction which must be placed upon the phenolic substitutent is that there be no amide-forming groups in the phenolic molecule, e. g. amino or carboxylic groups. The formaldehyde-generating reagents which may be used include, in addition to formaldehyde, such materials as paraformaldehyde, trioxymethylene and methylal.

To prevent oxidation during the reaction other oxygen-free gases than nitrogen may be used. The relative amount of phenolic material to the polyamide ingredients can be varied over a wide range. For the best results the ratio of polyamide composition to phenol-formaldehyde composition will range from 20:1 to 1:1. In order to obtain fiber-forming products the ratio of polyamide to phenol-formaldehyde should in general be at least 5:1 and preferably at least 10:1.

The present products, obtained by reacting formaldehyde with a mixture of a phenol and low molecular weight polyamide in bulk, are distinguished from the products obtained by treating with formaldehyde fiber-forming polyamides or articles such as fibers, films, etc. made from the high molecular weight or fiber-forming polyamides which contain phenol, in that they are more transparent and more readily pulverized. The latter property in particular makes the products more suitable for mixing with other ingredients and more adaptable to use in molding. The products of this invention are highly homogeneous mixtures which are in most instances transparent, hard solids.

The method of this invention permits the preparation of modified polyamides of widely different properties and has the further advantage that the material cost is lower than in the case of the unmodified polyamides. These products, depending upon their properties, are useful in the plastic, molding, sizing, impregnating, coating, and related arts. The products absorb less water than unmodified polyamides. In various applications the products may be mixed with one or another or with other agents, such as plasticizers, resins, cellulose derivatives, pigments, fillers, dyes, and the like. These agents can in many cases be incorporated with the original reactants from which the modified polyamide is prepared.

The modified polyamides prepared by the process of this invention are superior to the unmodified polyamides for certain purposes because they may be prepared as transparent plastic solids with a high gloss. A further advantage is that the products are more readily moldable than the unmodified polyamides and are heat hardenable. Furthermore, by using smaller amounts of hexamethylenetetramine, it is possible to obtain friable materials which are readily ground to powders suitable as molding powders. These powders may then be treated with more hexamethylenetetramine and molded to give insoluble and infusible molded products. Fillers may be used in molding if desired.

The word "formaldehyde" as used in the claims is intended to include formaldehyde-liberating substances.

As many apparently widely different embodiments of this invention may be made without departing from the spirit and scope thereof, it is to be understood that I do not limit myself to the specific embodiments thereof except as defined in the appended claims.

I claim:

1. A process which comprises intimately mixing a non-fiber-forming synthetic polyamide with a phenol free from amide-forming groups, and then heating the mixture with formaldehyde until formation of phenol-formaldehyde condensation product and further polymerization of said polyamide occurs, said polyamide being the reaction product of a polyamide-forming composition comprising reacting material selected from the class consisting of (a) monoaminomonocarboxylic acids, and (b) mixtures of diamine with dibasic carboxylic acid.

2. A process which comprises heating a polyamide forming composition in the presence of a phenol free from amide-forming groups until a low molecular weight polyamide capable of substantial further polymerization is obtained, and then heating the resulting mixture of polyamide and phenol with formaldehyde until formation of phenol-formaldehyde condensation product and further polymerization of said polyamide occurs, said polyamide-forming composition comprising reacting material selected from the class consisting of (a) monoaminomonocarboxylic acids, and (b) mixtures of diamine with dibasic carboxylic acid.

3. A process which comprises heating in a closed system a polyamide-forming composition and a phenol free from amide-forming groups until polymerization is substantially complete under these conditions, and then heating the resulting mixture of low molecular weight polyamide and phenol with formaldehyde under conditions permitting escape of any by-product until formation of phenol-formaldehyde condensation product and further polymerization of said polyamide has occurred, said polyamide-forming composition comprising reacting material selected from the class consisting of (a) monoaminomonocarboxylic acids, and (b) mixtures of diamine with dibasic carboxylic acid.

4. The process set forth in claim 1 in which said polyamide is that obtained from reactants comprising a diamine and a dibasic carboxylic acid.

5. The process set forth in claim 1 in which said polyamide is that obtained from reactants comprising an aminocarboxylic acid.

6. The process set forth in claim 1 in which said polyamide is polyhexamethylene adipamide.

7. The process set forth in claim 1 in which said polyamide is an interpolyamide.

8. The reaction product of formaldehyde and an intimate mixture of non-fiber-forming polyamide with a phenol free from amide-forming groups, said product being that obtained by heating said mixture with formaldehyde until further polymerization of said polyamide and formation of phenol-formaldehyde condensation product occurs, said polyamide being the reaction product of a polyamide-forming composition comprising reacting material selected from the class consisting of (a) monoaminomonocarboxylic acids, and (b) mixtures of diamine with dibasic carboxylic acid.

9. The reaction product set forth in claim 8 in which said polyamide is polyhexamethylene adipamide.

10. The reaction product set forth in claim 8 in which said polyamide is an interpolyamide.

WILLIAM E. HANFORD.